(12) United States Patent
Hoffmann et al.

(10) Patent No.: US 7,520,137 B2
(45) Date of Patent: Apr. 21, 2009

(54) METHOD OF CONTROLLING THE INJECTION OF LIQUID INTO AN INFLOW DUCT OF A PRIME MOVER OR DRIVEN MACHINE

(75) Inventors: Juergen Hoffmann, Untersiggenthal (CH); Charles Raymond Matz, Neuenhof (CH)

(73) Assignee: ALSTOM Technology Ltd, Baden (CH)

( * ) Notice: Subject to any disclaimer, the term of this patent is extended or adjusted under 35 U.S.C. 154(b) by 5 days.

(21) Appl. No.: 11/142,328

(22) Filed: Jun. 2, 2005

(65) Prior Publication Data

US 2005/0279101 A1    Dec. 22, 2005

Related U.S. Application Data

(63) Continuation of application No. PCT/EP03/50901, filed on Nov. 26, 2003.

(30) Foreign Application Priority Data

Dec. 2, 2002    (DE) ................ 102 56 193

(51) Int. Cl.
*F02C 3/30* (2006.01)
(52) U.S. Cl. ............... 60/775; 60/39.53; 60/39.3
(58) Field of Classification Search .......... 60/775, 60/39.53, 39.3; 123/25 A
See application file for complete search history.

(56) References Cited

U.S. PATENT DOCUMENTS

| 986,308 A | 3/1911 | Ostergren |
| 1,265,650 A | 5/1918 | Graemiger |
| 1,384,570 A | 7/1921 | Schwarz |
| 2,115,338 A | 4/1938 | Lysholm .................. 60/42 |

(Continued)

FOREIGN PATENT DOCUMENTS

DE    1 239 888    5/1967

(Continued)

OTHER PUBLICATIONS

S. Brusca et al., "Fogging for Evaporative Cooling Effects on Siemens V94.2 Gas Turbine Performance," Proceedings of IJPGC '02, 2002 International Joint Power Generation Conference, Phoenix, AZ, USA, Jun. 24-26, 2002, IJPGC2002-26189, American Society of Mechanical Engineers.

(Continued)

*Primary Examiner*—Ted Kim
(74) *Attorney, Agent, or Firm*—Steptoe & Johnson LLP

(57) ABSTRACT

The injection of finely atomized liquid-droplets into the intake air flow of a compressor is used, for example, to improve the output of a gas turbine. If the atomization is effected via pressure atomizer nozzles, it is advantageous, when the injection device is operated with a portion of the design mass flow, to admit liquid to only some of the atomizer nozzles of the injection device. The atomizer nozzles may be arranged on nozzle tubes, liquid being jointly admitted to all the atomizer nozzles arranged on a respective nozzle tube, operated in such a way that the same mass flow is injected on each side of a symmetry line. To this end, nozzle tubes may be combined to form groups, to which liquid is jointly admitted, and the tubes of a group may be arranged in mirror image to one another relative to the symmetry line.

24 Claims, 5 Drawing Sheets

U.S. PATENT DOCUMENTS

| | | | |
|---|---|---|---|
| 2,219,994 A | 10/1940 | Jung | 60/41 |
| 2,322,717 A | 6/1943 | Nettel | 60/41 |
| 2,365,616 A | 12/1944 | Zweifel | 60/42 |
| 2,438,998 A | 4/1948 | Halford | 60/42 |
| 2,469,678 A | 5/1949 | Wyman | 60/42 |
| 2,469,679 A | 5/1949 | Wyman | 60/42 |
| 2,489,683 A | 11/1949 | Stalker | 60/41 |
| 2,648,196 A | 8/1953 | Mullen, II et al. | 60/39.55 |
| 2,657,530 A | 11/1953 | Lee, II | 60/39.28 |
| 2,678,531 A | 5/1954 | Miller | 60/39.05 |
| 2,686,631 A | 8/1954 | Jordan | 230/209 |
| 2,689,452 A | 9/1954 | Jordan | 60/35.6 |
| 2,727,734 A * | 12/1955 | Vincent | 366/22 |
| 2,863,282 A | 12/1958 | Torell | 60/35.6 |
| 2,869,670 A | 1/1959 | Hoffman | 181/35 |
| 2,927,423 A | 3/1960 | Wisniowski | 60/35.6 |
| 2,941,356 A | 6/1960 | Blackman | 60/39.23 |
| 2,974,482 A | 3/1961 | Kelley | 60/39.3 |
| 3,100,964 A | 8/1963 | Bevers et al. | 60/39.3 |
| 3,353,360 A | 11/1967 | Gorzegno | 60/39.18 |
| 3,359,737 A | 12/1967 | Lewis | 60/265 |
| 3,623,668 A | 11/1971 | Freid et al. | 239/265.17 |
| 3,630,030 A | 12/1971 | Wagner | 60/274 |
| 3,693,347 A | 9/1972 | Kydd et al. | 60/39.05 |
| 3,736,074 A | 5/1973 | Kilbane et al. | 417/279 |
| 3,815,356 A | 6/1974 | Burge et al. | 60/204 |
| 3,894,691 A | 7/1975 | Mee | 239/524 |
| 3,936,215 A | 2/1976 | Hoff | 415/11.5 |
| 4,002,023 A | 1/1977 | Hartmann | 60/39.31 |
| 4,036,028 A | 7/1977 | Mandrin | 62/52 |
| 4,196,020 A * | 4/1980 | Hornak et al. | 134/167 R |
| 4,199,295 A | 4/1980 | Raffy et al. | 415/115 |
| 4,260,350 A * | 4/1981 | Russell, Jr. | 425/197 |
| 4,281,511 A | 8/1981 | Neale | 60/39.53 |
| 4,311,439 A | 1/1982 | Stofen | 417/313 |
| 4,418,527 A | 12/1983 | Schlom et al. | 60/39.05 |
| 4,478,553 A | 10/1984 | Leibowitz et al. | 416/97 R |
| 4,519,207 A | 5/1985 | Okabe et al. | 60/39.182 |
| 4,569,195 A | 2/1986 | Johnson | 60/39.3 |
| 4,572,428 A | 2/1986 | Groff et al. | 236/44 A |
| 4,667,465 A | 5/1987 | Munk | 60/39.3 |
| 4,702,074 A | 10/1987 | Munk | 60/39.511 |
| 4,731,990 A | 3/1988 | Munk | 60/39.05 |
| 4,928,478 A | 5/1990 | Maslak | 60/39.05 |
| 5,011,540 A | 4/1991 | McDermott | 134/23 |
| 5,083,423 A | 1/1992 | Prochaska et al. | 60/39.02 |
| 5,191,767 A | 3/1993 | Kane et al. | 60/728 |
| 5,193,976 A | 3/1993 | Kolev et al. | 415/116 |
| 5,203,161 A | 4/1993 | Lehto | 60/39.53 |
| 5,273,395 A | 12/1993 | McDermott | 415/121.3 |
| 5,282,726 A | 2/1994 | Warren | 417/243 |
| 5,313,783 A | 5/1994 | Althaus | 60/39.181 |
| 5,326,254 A | 7/1994 | Munk | 431/115 |
| 5,353,585 A | 10/1994 | Munk | 60/39.05 |
| 5,463,873 A | 11/1995 | Early et al. | 62/121 |
| 5,481,865 A | 1/1996 | Frutschi | 60/39.03 |
| 5,496,012 A | 3/1996 | Kenny, III | 251/294 |
| 5,525,268 A | 6/1996 | Reens | 261/78.2 |
| 5,537,813 A | 7/1996 | Davis et al. | 60/39.05 |
| 5,560,195 A | 10/1996 | Anderson et al. | 60/39.07 |
| 5,669,217 A | 9/1997 | Anderson | 60/39.05 |
| 5,689,948 A | 11/1997 | Frutschi | 60/39.05 |
| 5,758,485 A | 6/1998 | Frutschi | 60/39.02 |
| 5,790,972 A | 8/1998 | Kohlenberger | 701/103 |
| 5,839,269 A | 11/1998 | Frutschi | 60/39.02 |
| 5,867,977 A | 2/1999 | Zachary et al. | 60/39.53 |
| 5,884,470 A | 3/1999 | Frutschi | 60/39.05 |
| 5,906,095 A | 5/1999 | Frutschi | 60/39.05 |
| 5,930,990 A | 8/1999 | Zachary et al. | 60/39.53 |
| 6,038,848 A | 3/2000 | Frutschi | 60/39.05 |
| 6,178,735 B1 | 1/2001 | Frutschi | 60/39.02 |
| 6,178,738 B1 | 1/2001 | Frutschi | 60/39.05 |
| 6,199,363 B1 | 3/2001 | Frutschi | 60/39.05 |
| 6,202,399 B1 | 3/2001 | Frutschi | 60/39.03 |
| 6,216,443 B1 | 4/2001 | Utamura | 60/39.53 |
| 6,223,523 B1 | 5/2001 | Frutschi | 60/39.05 |
| 6,247,302 B1 | 6/2001 | Tsukamoto et al. | 60/39.511 |
| 6,250,064 B1 | 6/2001 | Tomlinson et al. | 60/39.05 |
| 6,256,976 B1 | 7/2001 | Kataoka et al. | 60/39.05 |
| 6,260,350 B1 | 7/2001 | Horii et al. | 60/39.3 |
| 6,286,301 B1 | 9/2001 | Utamura | 60/39.53 |
| 6,357,236 B1 | 3/2002 | Utamura | 60/728 |
| 6,363,709 B2 | 4/2002 | Kataoka et al. | 60/39.05 |
| 6,378,284 B1 | 4/2002 | Utamura | 60/39.05 |
| 6,389,799 B1 | 5/2002 | Hatamiya et al. | 60/39.3 |
| 6,397,578 B2 | 6/2002 | Tsukamoto et al. | 60/39.511 |
| 6,463,741 B1 | 10/2002 | Frutschi | 60/780 |
| 6,470,667 B1 | 10/2002 | Payling et al. | 60/39.3 |
| 6,470,668 B2 | 10/2002 | Payling et al. | 60/39.3 |
| 6,478,289 B1 * | 11/2002 | Trewin | 261/27 |
| 6,484,508 B2 | 11/2002 | Rocklin et al. | 60/775 |
| 6,530,210 B2 | 3/2003 | Horii et al. | 60/39.53 |
| 6,568,167 B2 | 5/2003 | Horii et al. | 60/39.281 |
| 6,568,168 B2 | 5/2003 | Horii et al. | 60/39.3 |
| 6,581,368 B2 | 6/2003 | Utamura | 60/39.3 |
| 6,598,401 B1 | 7/2003 | Utamura | 60/775 |
| 6,598,402 B2 | 7/2003 | Kataoka et al. | 60/775 |
| 6,609,360 B2 | 8/2003 | Utamura | 60/39.092 |
| 6,634,165 B2 | 10/2003 | Tomlinson et al. | 60/39.3 |
| 6,640,550 B2 | 11/2003 | Hoffmann et al. | 60/785 |
| 6,705,074 B2 | 3/2004 | Horii et al. | 60/39.53 |
| 6,711,888 B2 | 3/2004 | Horii et al. | 60/39.3 |
| 6,715,916 B2 | 4/2004 | Tomlinson et al. | 374/144 |
| 6,779,332 B2 | 8/2004 | Horii et al. | 60/39.3 |
| 6,805,483 B2 | 10/2004 | Tomlinson et al. | 374/144 |
| 6,935,119 B2 | 8/2005 | Placko et al. | 60/775 |
| 6,938,405 B2 * | 9/2005 | Carberg et al. | 60/39.53 |
| RE38,831 E | 10/2005 | Horii et al. | 60/39.3 |
| 6,973,772 B2 | 12/2005 | Hatamiya et al. | 60/39.511 |
| RE39,092 E | 5/2006 | Horii et al. | 60/39.53 |
| 7,040,083 B2 | 5/2006 | Horii et al. | 60/39.3 |
| 7,104,749 B2 | 9/2006 | Frutschi | 415/1 |
| 7,104,750 B2 | 9/2006 | Bolis et al. | 415/116 |
| 7,146,794 B2 | 12/2006 | Hatamiya et al. | 60/39.511 |
| 7,353,654 B2 | 4/2008 | Bolis et al. | 60/775 |
| 7,353,655 B2 | 4/2008 | Bolis et al. | 60/775 |
| 7,353,656 B2 | 4/2008 | Bolis et al. | 60/775 |
| 2001/0039794 A1 | 11/2001 | Rocklin et al. | 60/39.05 |
| 2001/0042381 A1 | 11/2001 | Dodo et al. | 62/238.3 |
| 2002/0026783 A1 | 3/2002 | Utamura | 60/39.01 |
| 2002/0083712 A1 | 7/2002 | Tomlinson et al. | 60/775 |
| 2004/0025491 A1 | 2/2004 | Hoffmann et al. | 60/39.182 |
| 2004/0103667 A1 | 6/2004 | Frutschi | 60/775 |
| 2004/0105755 A1 | 6/2004 | Bolis et al. | 415/116 |
| 2004/0112037 A1 | 6/2004 | Yagi et al. | 60/39.3 |
| 2004/0213675 A1 | 10/2004 | Blangetti et al. | 416/241 R |
| 2004/0221584 A1 | 11/2004 | Hoffmann et al. | 60/782 |
| 2005/0066664 A1 | 3/2005 | Shibata et al. | 60/775 |
| 2005/0076646 A1 | 4/2005 | Bolis et al. | 60/775 |
| 2005/0081529 A1 | 4/2005 | Bolis et al. | 60/775 |
| 2005/0109033 A1 | 5/2005 | Braun et al. | 60/772 |
| 2005/0141991 A1 | 6/2005 | Frutschi | 415/144 |
| 2005/0279101 A1 | 12/2005 | Hoffmann et al. | 60/775 |
| 2006/0137356 A1 | 6/2006 | Jimenez Haertel et al. | 60/775 |
| 2006/0218931 A1 | 10/2006 | Haertel et al. | 60/775 |
| 2007/0113561 A1 | 5/2007 | Bolis et al. | 60/775 |

FOREIGN PATENT DOCUMENTS

| | | |
|---|---|---|
| DE | 693 06 026 T2 | 5/1997 |
| DE | 198 52 060 A1 | 5/2000 |
| DE | 199 00 026 A1 | 7/2000 |
| DE | 199 61 383 A1 | 6/2001 |
| DE | 101 15 117 A1 | 10/2002 |

| | | | |
|---|---|---|---|
| DE | 101 53 911 A1 | 5/2003 | |
| DE | 102 07 197 A1 | 9/2003 | |
| DE | 102 54 721 A1 | 6/2004 | |
| EP | 0 565 373 A2 | 10/1993 | |
| EP | 0 789 134 A2 | 1/1997 | |
| EP | 0 770 771 A1 | 5/1997 | |
| EP | 0 781 909 A2 | 7/1997 | |
| EP | 0 899 438 A1 | 8/1997 | |
| EP | 0 887 530 A2 | 12/1998 | |
| EP | 0 889 212 A2 | 1/1999 | |
| EP | 0 978 635 A1 | 2/2000 | |
| EP | 0 990 780 A1 | 4/2000 | |
| EP | 1 108 870 A2 | 6/2001 | |
| EP | 1 203 866 A2 | 5/2002 | |
| EP | 1 205 640 A2 | 5/2002 | |
| EP | 1 225 306 A1 | 7/2002 | |
| EP | 1 422 403 A1 | 11/2003 | |
| FR | 1563749 | 4/1969 | |
| GB | 2 280 224 A | 1/1995 | |
| GB | 2 357 552 A | 6/2001 | |
| GB | 2 382 847 A | 6/2003 | |
| JP | 56-43433 U1 | 9/1981 | |
| JP | 61-37794 Y2 | 11/1986 | |
| JP | 61-283723 | 12/1986 | |
| JP | 63-248931 | 10/1988 | |
| JP | 2-211331 | 8/1990 | |
| JP | 5-195809 | 8/1993 | |
| JP | 6-10702 | 1/1994 | |
| JP | 7-97933 | 4/1995 | |
| JP | 2004-176717 | 6/2004 | |
| WO | WO 97/43530 | 11/1997 | |
| WO | WO 98/48159 | 10/1998 | |
| WO | WO 99/67519 | 12/1999 | |
| WO | WO 00/50739 | 8/2000 | |
| WO | WO 03/038256 A1 | 5/2003 | |
| WO | WO 03/071113 A1 | 8/2003 | |
| WO | WO 2004/051062 A1 | 6/2004 | |

OTHER PUBLICATIONS

Elliott Smith et al., "Wet Compression for Gas Turbines: Power Augmentation and Efficiency Upgrade," Proceedings of the American Power Conference, Apr. 10-12, 2000, Chicago, Illinois Institute of Technology, vol. 62, p. 106-111.

Drew Robb, "Specifying and Installing High-Pressure Fog Systems," *Power Engineering*, Apr. 2000, p. 48-51.

Thomas R. Mee III, "Inlet Fogging Augments Power Production," *Power Engineering*, Feb. 1999, p. 26-30.

Jean-Pierre Stalder, "Gas Turbine Compressor Washing State of the Art—Field Experiences," presented at the International Gas Turbine & Aeroengine Congress & Exhibition, Stockholm, Sweden, Jun. 2-5, 1998, published by the American Society of Mechanical Engineers, Paper 98-GT-420.

Stephen J. Molis et al., "Capacity Enhancement for Simple and Combined Cycle Gas Turbine Power Plants," Power-Gen International '97, Sep. 25, 1997.

A. P. Tarabrin et al., "An Analysis of Axial Compressors Fouling and a Cleaning Method of Their Blading," presented at the International Gas Turbine and Aeroengine Congress & Exhibition, Birmingham, UK, Jun. 10-13, 1996, published by the American Society of Mechanical Engineers, Paper 96-GT-363.

*Gas Turbine and Combined Cycle Capacity Enhancement, Second Interim Report*, EPRI TR-104612, Jan. 1995, p. 2-8, 2-9, 2-13, 3-6, 3-7, 4-5, 4-11, 4-16, 4-31, 4-32, 4-33, 4-34, 4-78, 4-80, 4-88, 4-89, 4-90, and 4-91.

J. Kevin Cross et al, "Modeling of Hybrid Combustion Turbine Inlet Air Cooling Systems," ASHRAE Transactions: Symposia, vol. 101, Part 2, Technical and Symposium Papers Presented at the 1995 Annual Meeting, San Diego, CA, 1995, p. 1335-1341.

Thomas Robinson, "Water Injected LM 1600 Installation and Operating Experience," presented at the International Gas Turbine and Aeroengine Congress and Exposition, The Hague, Netherlands, Jun. 13-16, 1994, published by the American Society of Mechanical Engineers, Paper 94-GT-451.

J. De Ruyck et al., "An Externally Fired Evaporative Gas Turbine Cycle for Small Scale Biomass CHP Production," IGTI-vol. 9, ASME COGEN-TURBO power congress and exposition: gas turbines in cogeneration and utility, industrial and independent power generation, Portland, Oregon, Oct. 25-27, 1994, p. 631-640, ASME, 1994.

*Gas Turbine and Combined-Cycle Capacity Enhancement, Interim Report*, EPRI TR-102412, Oct. 1993, p. 3-6, 4-3, 4-4, 4-18, 4-19, and 5-6.

"On line washing gives firm output gains for UNA," *Turbomachinery International*, May/Jun. 1993.

Hugh M. Henneberry et al., Analysis of Gas Turbine Engines Using Water and Oxygen Injection to Achieve High Mach Numbers and High Thrust, NASA Technical Memorandum 106270, NASA, Jul. 1993.

Luke H. Rogers et al., "Performance Calculations and Research Direction for a Water Enhanced Regenerative Gas Turbine Cycle," presented at the Intersociety Energy Conversion Engineering Conference held Aug. 8-13, 1993 in Atlanta, Georgia, sponsored by the American Chemical Society, and published by SAE in the Proceedings of the 28th Intersociety Energy Conversion Engineering Conference, vol. 1, pp. 1.949-1.954.

W. Krakowitzer et al., "GT13E2 with annular combustor will boost Deeside efficiency," *Modern Power Systems*, May 1992.

Eric Jeffs, "Compressor washing on line for large gas turbines," *Turbomachinery International*, Sep./Oct. 1992.

Gary L. Haub et al., "Field Evaluation of On-Line Compressor Cleaning in Heavy Duty Industrial Gas Turbines," 1990, American Society of Mechanical Engineers Paper 90-GT-107.

J. P. Nolan et al., "Gas Turbine Performance Improvement Direct Mixing Evaporative Cooling System American Atlas Cogeneration Facility Rifle, Colorado," presented at the Gas Turbine and Aeroengine Congress and Exposition held Jun. 11-14, 1990 in Brussels, Belgium, published by the American Society of Mechanical Engineers, Paper 90-GT-368.

B. M. Barnum et al., "Gas Turbine Performance Deterioration and Water Wash Frequency," 1981, published by the American Society of Mechanical Engineers, Paper 81-JPGC-GT-10.

Kawabata, "Turbine Generator," Jun. 2, 1981.

R. V. Kleinschmidt, "Value of Wet Compression in Gas-Turbine Cycles," *Mechanical Engineering*, 69(2), pp. 115-116 Feb. 1947 (see also The Engineers' Digest (British), V. 8(8), Aug. 1947, p. 270-71.

J. van Liere et al., "Retrofit of gas turbines by SwirlFlash® overspray," undated.

"WAC Water Atomization Cooling System for Economical Power Boosting of Land Based Gas Turbine," Hitachi WAC System, Hitachi, Ltd., undated.

EPRI Technical Brief, "EPRI Technology to Enhance Combustion Turbine Output," undated.

* cited by examiner

METHOD OF CONTROLLING THE INJECTION OF LIQUID INTO AN INFLOW DUCT OF A PRIME MOVER OR DRIVEN MACHINE

CROSS-REFERENCE TO RELATED APPLICATIONS

This application is a continuation of the U.S. National Stage designation of co-pending International Patent Application PCT/EP2003/050901 filed Nov. 26, 2003, which claims priority to German patent application no. 102 56 193.1 filed Dec. 2, 2002, and the entire contents of these applications are expressly incorporated herein by reference thereto.

FIELD OF THE INVENTION

The invention relates to a method of controlling the injection of liquid into an inflow duct of a prime mover or driven machine, and also relates to a device for carrying out the method.

BACKGROUND OF THE INVENTION

A gas is heated during its adiabatic compression. Due to the heating and the associated increase in volume, the requisite compression work is increased. This has various adverse consequences at the compressor of a gas turboset. The increased inlet temperature at the combustor can result in lower firing of the gas turboset. The compression requires a greater proportion of the turbine work and takes place at a poorer efficiency. In addition, cooling air branched off from the compressor is available only at an already greatly increased temperature level. Consequently, the output and efficiency potentials of the gas turboset are adversely affected.

Attempts are consequently made to limit this temperature increase, for example by intermediate-cooling stages during the compression. The "isothermal compression" is also of interest in this connection. The injection of a liquid, in particular water, into the compressor or into its inflow (the latter injection being especially simple to realize) in such a way that liquid droplets enter the compressor is in this case an especially simple means of achieving internal cooling of the compressor by the evaporation of this liquid. By a liquid being sprayed into the compressor or into the regions located upstream of the compressor, a similar cooling effect as with an intermediate-cooler heat exchanger can be achieved by the evaporation inside the compressor. This involves an approximation to the "quasi-isothermal compression." On account of the lower temperatures achieved by means of the quasi-isothermal compression and the associated higher specific density of the gas to be compressed, less energy is required for the compression. FR 1563749 has already described the positive effects of the injection of liquid into compressors, but at the same time emphasizes the importance of fine atomization and uniform distribution of the liquid.

It is not actually unusual for water to penetrate into a compressor during operation, thus during the cleaning of a stationary gas turbine or in an aircraft engine when flying through clouds or rain. However, since permanent water injection could lead to problems on account of blade erosion, the sprayed liquid must be atomized very finely into very small droplets. Therefore the challenge with corresponding technical solutions has hitherto been to realize water spraying with very small droplets, normally 0.9-5 μm in diameter during "flash atomization" and 20-40 μm during high-pressure atomization. At the same time, the sprayed quantity of these droplets must be so large that it is sufficient for cooling the air during the compression.

WO 99/67519 discloses the "swirl-flash technology" for generating very fine droplets. It is based on the fundamental principle that a liquid is pressurized, superheated and then sprayed by means of a nozzle. The liquid, in particular water, discharges from the nozzle in a typical cone. The droplet size is approximately 25 μm. Since the temperature of the liquid is considerably above the boiling point at ambient pressure, spontaneous boiling occurs in such a way that each droplet, during the spraying process, explodes from 25 μm into about 1000 fragments having a size of approximately 2.5 μm.

For the intended purpose, the kinetics of the evaporation are also of importance. The retention time in a compressor is short. It is normally around 10 milliseconds for an axial-flow compressor, and is even lower for a radial-flow compressor. This means that the evaporation has to be effected within milliseconds. As already explained, the very fine droplets in combination with the high temperature permit the desired rapid evaporation.

A device and a method for spraying a cooling medium into the supply air flow of a gas turbine plant are described in U.S. Pat. No. 5,930,990. In this case, the injection nozzles are fastened in a lattice shape on or in a tube carrier arrangement. This tube carrier arrangement, via which the nozzles are also supplied with liquid, may be arranged at various points in the inflow duct of the gas turboset. The nozzles may in this case be arranged as a function of the respective flow parameters. In addition, it is possible in each case to combine a plurality of nozzles to form a group, so that the injected liquid quantity can be adapted, for example, to the variable fresh-air flow by multistage switching-on of the nozzle groups. The variation in the liquid mass flow by multistage switching-on has the advantage that the pressure drop over the active nozzles and thus the atomizing quality remain largely constant during different liquid mass flows. On the other hand, the profile of the droplet load of the intake air may greatly vary and have steep gradients due to the switching-on and switching-off of various nozzle groups.

In addition to a suitable design of the nozzles, it is necessary to spray liquid droplets into the inflow as homogeneously as possible over the entire inflow cross section. In addition to the atomizing quality, FR 1563749 also mentions that the homogeneous, uniform distribution of the liquid introduced is also decisive. A distribution which is very uneven results in locally varying cooling in the compressor. The resulting warm and cold strands reduce the pumping distance (surge margin) of the compressor and in the extreme case may lead to the distortion of the casing.

SUMMARY OF THE INVENTION

The invention relates to a method of the type mentioned at the beginning which avoids the disadvantages of the prior art. In particular, the invention relates to a method which controls the liquid spraying in such a way that a profile of the droplet load which is as favorable as possible for the operation of the downstream compressor is produced, even during operation of only some of the injection nozzles.

The invention relates to controlling the injection of liquid in such a way that, if at all possible, a symmetrical pattern of the injection is produced. This is achieved by virtue of the fact that, on each side of a symmetry line of the injection device, liquid is admitted to so many nozzles that the sum of the partial mass flows passed through the individual atomizer nozzles is at least approximately the same on each side of the symmetry line. In this case, the expression "symmetry line"

refers to a symmetry line of the injection device in the fitted state. That is to say that the injection device itself could also be asymmetrical, provided the inflow duct has a line at which it is at least approximately symmetrical; the symmetry of the inflow duct is then decisive—as is apparent to the person skilled in the art. To this end, the liquid feed to individual atomizer nozzles, or also to a plurality of atomizer nozzles combined to form a group, is preferably released or shut off selectively by a shut-off member. If all the atomizer nozzles have an identical throughflow behavior, that is to say the same relative partial mass flow, relative to the total mass flow of the entire injection device under the: same pressure conditions, liquid is admitted to the same number of atomizer nozzles preferably in mirror-image arrangement, on both sides of a symmetry line. In a preferred embodiment of the invention, a plurality of atomizer nozzles are combined to form at least one nozzle group and liquid is jointly admitted to them. In a preferred embodiment of the invention, in which at least a number of atomizer nozzles are arranged on at least one nozzle tube, liquid is jointly admitted to all the nozzles arranged on a nozzle tube. Furthermore, such a nozzle tube construction is assumed in particular in the exemplary embodiments. However, the statements made therein in relation to the activation of nozzle tubes may readily be applied to the activation of individual nozzles or, to nozzles which are combined in groups and are not arranged on tubes.

In an injection device having a nozzle tube construction as disclosed per se by the prior art, the injection of liquid is controlled according to the invention in such a way that, on each side of a symmetry line of the injection device, liquid is admitted to so many tubes that the mass flows passed through the tubes are the same on each side of the symmetry line; admission of liquid to the nozzle tubes in mirror image is preferably effected. The admission of liquid is effected by the liquid feed to individual nozzle tubes, or also to a plurality of combined nozzle tubes, being preferably released or shut off by a shut-off member. In this case, the admission of liquid to a group of tubes may be effected by a plurality of shut-off members being operated simultaneously.

In an embodiment of the invention, the supply lines of the nozzles and/or tubes combined to form a group are brought together at a point situated upstream in such a way that all the nozzles and/or tubes of the group can be activated via a common shut-off member. In this case, the admission of liquid to individual nozzles and/or tubes via in each case separate shut-off members ensures greater flexibility of the injection pattern to be realized, whereas the activation of an entire group via a common shut-off member leads to a simplification in terms of equipment and control.

In a preferred embodiment of the invention, the pressure difference over the injection nozzles is kept constant. The liquid mass flow, in good approximation, is then proportional to the entire nozzle cross section to which liquid is admitted; provided that all the nozzles are identical, which is an advantageous aim, the liquid mass flow is proportional to the number of nozzles to which liquid is admitted. In a preferred embodiment, all the nozzles have an identical throughflow behavior. Furthermore, in one embodiment, all the tubes have an identical nozzle complement. The injected liquid mass flow is then proportional to the number of nozzles and/or tubes to which liquid is admitted. If this is not the case, an individual partial mass flow may be assigned to each tube. If pressure atomizer nozzles are used for spraying the liquid, the pressure drop over the nozzles is as a rule around a few 10 bar, for example 30-50 bar. In contrast, the pressure change in the inflow duct is negligible, so that it is sufficient as a rule for the supply pressure of the liquid in the tubes or in the feed line system to the nozzles and/or tubes to be kept constant. As a result, the mass flow delivered by a liquid pump can be controlled very simply in such a way that the supply pressure remains constant.

In a preferred embodiment of the invention, liquid is admitted to nozzles and/or tubes arranged in mirror image to one another on each side of the symmetry axis. In a further embodiment, liquid is admitted to nozzles and/or tubes distributed as uniformly as possible over the cross section; for example, in an equidistant arrangement of the tubes, every second tube for 50% relative injection mass flow or every third tube for 33% relative injection mass flow. As indicated above, in a preferred variant of the invention, in each case a plurality of nozzles and/or tubes are combined to form a group and liquid is jointly admitted to them; it goes without saying that this also applies to the switching-off operation. In this case, the combining to form a group may be effected via the control of the method by provision being made for joint simultaneous switching of a plurality of shut-off members; on the other hand, a plurality of nozzles and/or tubes may be supplied from a common shut-off member, downstream of which the liquid feed line branches to individual nozzles and/or tubes. It is again advantageous in this case if nozzles and/or tubes are arranged in a group symmetrically to a symmetry line or center axis of the injection device.

In an embodiment of the invention, the nozzles and/or tubes are combined to form groups in such a way the relative group mass flow, also referred to below in short as group mass flow, that is to say the mass flow passed through the group, is constant in relation to the liquid mass flow of the entire injection device at identical pressures. Inca further embodiment, some of the groups have a first group mass flow, whereas at least one group has a smaller group mass flow, which in particular advantageously corresponds to around 50% of the first group mass flow. During an increase in the entire injection mass flow, liquid is then in each case always advantageously admitted to a second group having a small group mass flow, and, during a further increase in the total mass flow, a first group having a large group mass flow is switched on and at the same time the group having the smaller group mass flow is switched off. The mass flow increment during each switching operation then corresponds to the small group mass flow; however, the number of switching groups, compared with a switching operation in which all the groups have the small group mass flow and are operated sequentially, is virtually halved at the same mass flow increment.

Note that it is by no means necessary, for the groups to be mutually operated sequentially with time increments; it is even advantageous, if a certain mass flow is aimed at, to simultaneously operate all the groups necessary for this mass flow in order to increase the total mass flow over time in a single step. When mass flow increments and switching stages are referred to in connection with this invention, this refers to the sequence of the switching operation over the mass flow to be set. However, the latter can be set in a single step if the groups to be operated are known, so that there are no time increments. This is even advantageous in terms of operation, since the gas turboset is confronted only once with a transient change in the operating conditions and not several times in succession, as would be the case if the mass flow increments were to be switched on in time increments.

In a further preferred embodiment of the method, nozzles and/or tubes are combined to form groups in such a way and liquid is admitted to them in such a way that the group mass flows are geometrically graduated. In particular, a binary graduation of the group mass flows, with the ratio 2, is preferred here. In this case, the group mass flows relative to the smallest group mass flow behave like 1:2:4:8, and so forth; that is to say each group having a larger mass flow has twice the group mass flow as the group having the next smaller group mass flow. It is then possible, for example, to set 15 different equidistant total mass flows with only 4 controllable groups, or 31 equidistant mass flows with 5 groups. In general, with N groups graduated in a binary fashion, $2^N-1$ precisely equidistant mass flows can be realized.

With the present method, it is possible to graduate the injection quantity of the cooling medium in such a way as to be adapted to the operating mode, in particular the respectively deliverable or required output, of the prime mover or driven machine during operation thereof. Thus the various injection groups, to which the various injection nozzles are assigned, are switched on and/or off during the operation for increasing or reducing the cooling capacity in such a way that the change in the quantity of the injected cooling medium is possible in small steps from stage to stage, and consequently finely graduated mass flow desired values can be delivered.

With regard to the homogeneous spraying of the liquid, the flow zone in the inflow duct is preferably also to be taken into account. In this case, it is also of importance for the spraying of the liquid whether a laminar or a turbulent flow prevails at the corresponding injection points. In addition, it is to be taken into account that the flow velocities over the cross section of the intake duct are also variable. The spatial distribution of the injected liquid is effected in a further embodiment while taking into account these flow parameters.

BRIEF DESCRIPTION OF THE DRAWINGS

The method according to the invention is explained in more detail below with reference to the drawing, in which, in detail.

DETAILED DESCRIPTION OF THE PREFERRED EMBODIMENTS

Figure 1:
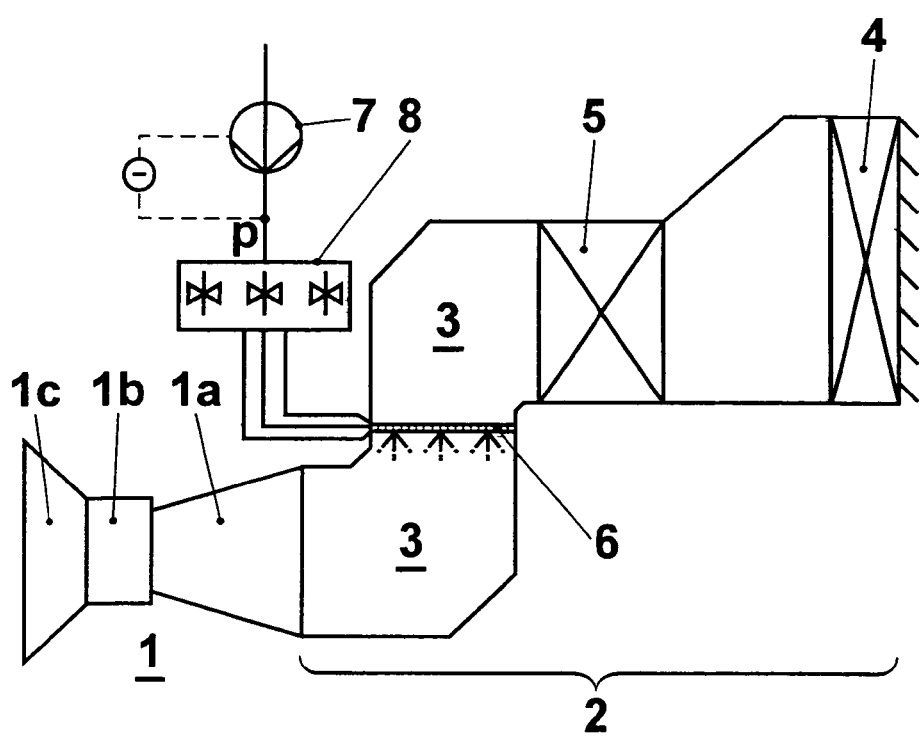
FIG. 1 shows a diagrammatic sketch of a gas turboset with an injection device arranged in an inflow duct.

FIG. 1 schematically illustrates the use of the method according to the invention with reference to the inflow duct of a gas turboset 1. The gas turboset shown by way of example has, without restricting the universality, a compressor 1a, a combustor 1b and a turbine 1c. Connected upstream of the compressor is an intake region 2 for preparing the intake air fed in the inflow duct 3. An air filter 4 and an intake silencer 5 are arranged in the intake region. A device 6 for injecting a liquid into the inflow duct 3 is arranged downstream of the intake silencer. This device serves in particular to introduce finely atomized liquid water droplets into the compressor 1a, where, as mentioned at the beginning, they evaporate and thereby internally cool the compressor. Downstream of this injection device, built-in components of large area are no longer arranged in the flow path up to the compressor inlet, apart from some bearing supports which are known from the prior art, but which only constitute a very small obstruction of the flow duct and are shaped in a fluidically favorable manner in such a way that liquid droplets are deflected around them essentially without interaction. This arrangement of liquid-injection nozzles directly upstream of the compressor inlet in the respect that no flow obstacles lie in the flow path and that the injection device is arranged in particular downstream of an air filter and a silencer has already been disclosed per se by U.S. Pat. No. 5,193,976 and had already been acknowledged at that time as being necessary, so that the droplets produced during the injection also pass into the compressor instead of being precipitated on built-in components of the inflow duct. For the intended use, the injection device 6 must be able to introduce liquid mass flows which vary to a very high degree into the inflow duct with sufficient and as far as possible uniform atomizing quality. To this end, when pressure atomizers are used, which advantageously do not require any auxiliary energy produced externally, it is actually imperative for liquid to be admitted to a varying number of injection nozzles. The admission of liquid to the nozzles is realized by a valve block 8, in which a number of shut-off members selectively release or shut off the flow at certain injection nozzles or groups of injection nozzles. A pump 7 delivers the liquid to be injected under pressure to the valve block 8, where the liquid quantity delivered is distributed to the individual nozzles or nozzle-groups through the shut-off members. A pressure-measuring point measures the pressure of the fed liquid, and the atomizing quality of pressure atomizers in the injection device 6 is kept essentially constant by keeping the pressure constant in a controlled manner. Thus, for example, the speed of a centrifugal pump 7 is increased in the event of a pressure reduction and is reduced during increasing pressure, as a result of which the pressure can be kept constant in a very simple manner independently of the mass flow actually passed through, or the mass flow is set in proportion to the nozzle cross sections to which fluid is admitted.

Figure 2:
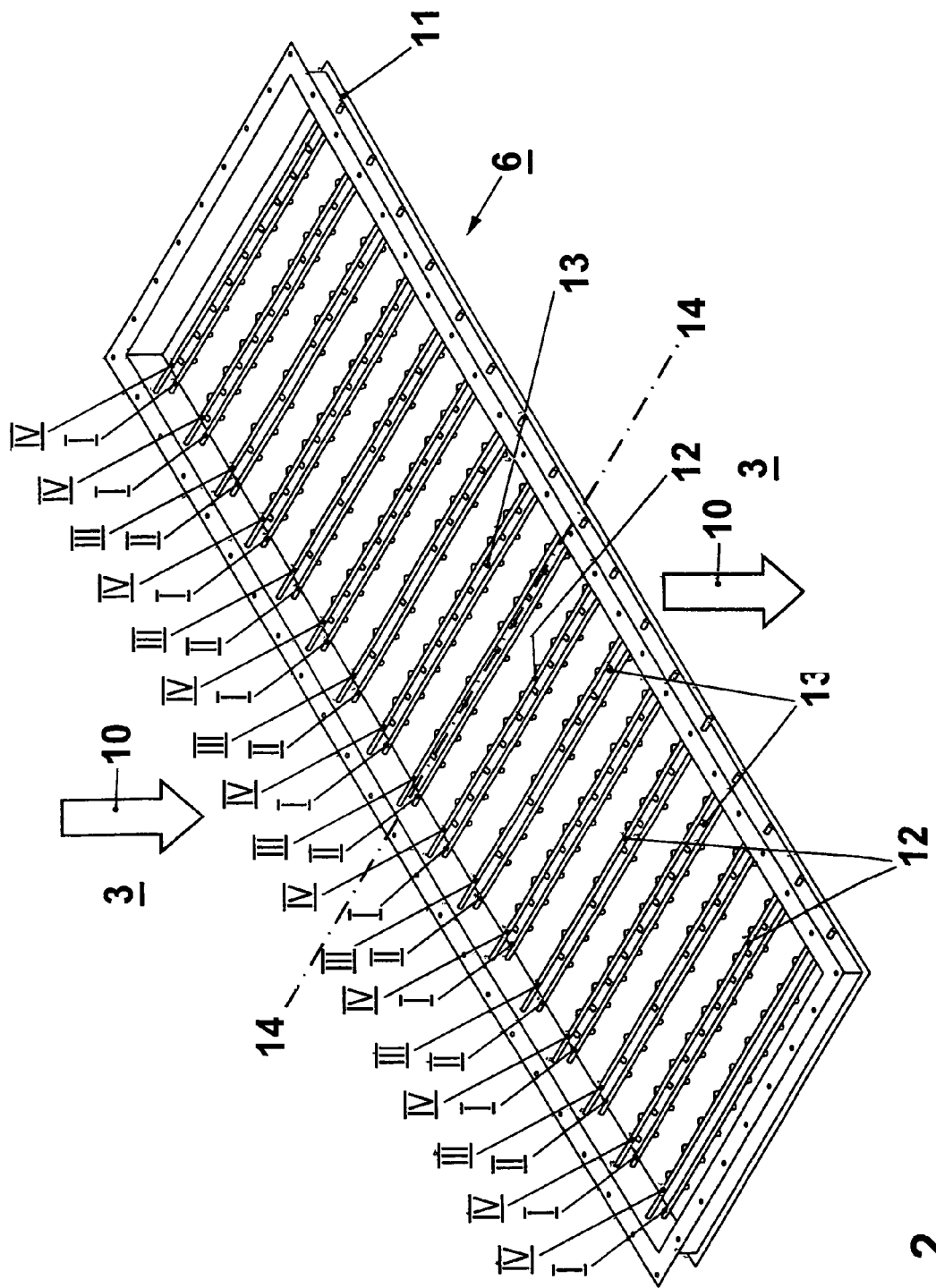
FIG. 2 shows an injection device for a rectangular inflow-duct cross section with binary graduation of tubes groups.

FIG. 2 shows an exemplary configuration of the injection device 6. Arranged in a frame 11 are 34 tubes 12, which in turn carry atomizer nozzles 13. The injection device 6 is conceived for an air flow 10 oriented normal to the area defined by the frame 11. In the exemplary embodiment depicted, two tubes are in each case arranged one behind the other in the direction of flow. This reduces the obstruction of the flow duct 3 and thus also the pressure losses caused by the injection device. The injection nozzles of the tubes situated downstream are oriented in the direction of the through flow provided. The injection nozzles of the tubes situated upstream are at an angle to the throughflow direction. The liquid atomized by these nozzles is injected into the respective gap between two of the tubes situated downstream, precipitation of the injected liquid on the tubes situated downstream is thus avoided. The entire injection device 6 is provided for a certain total nominal mass flow at a certain nominal pressure, which is predetermined essentially by the atomizer nozzles 13. On each tube 12, a number of nozzles are in each case actually already combined to form a group. Assigned to each nozzle tube 12 is a relative partial mass flow, which is determined as the mass flow passed through the tube under nominal conditions relative to the total mass flow of the injection device 6. Under the assumption—which is by no means imperative that all the nozzles 13 are identical, although this design generally brings about advantages, this relative partial mass flow is proportional to the number of nozzles 13 arranged on the nozzle tube 12. In the case of an injection mass flow which is below the total mass flow, liquid is admitted to only a corresponding proportion of the nozzle tubes. Thus the supply pressure of the liquid and therefore the pressure drop over the atomizer nozzles and consequently the atomizing quality can be kept constant. Furthermore, the injection device has a center axis or symmetry axis 14. In the example, the nozzles are arranged in mirror image to one another on each side of the center axis 14. According to the invention, in order to avoid asymmetry of the thermodynamic states, which is damaging to the downstream compressor, liquid is admitted on each side of the symmetry axis essentially to so many tubes that their accumulated partial mass flows are at least approximately identical on each side of the symmetry axis. To this end, depending on the design of the injection device, it is often sufficient for liquid to be admitted on each side to the same number of tubes, preferably in a mirror image arrangement. It is also advantageous in this case if liquid is admitted to tubes which are distributed over the cross section of flow as uniformly as possible. As mentioned, the activation is simplified if in each case a number of tubes are combined to form a group and are activated together; that is to say that liquid is admitted to all the tubes of a group or tone of the tubes of a group. For example, tubes are combined to form four groups I, II, III and IV. In this case, in one embodiment, the groups are selected in such a way that the group mass flows of the individual groups are geometrically graduated, in particular and preferably by a graduation factor 2, this of course also including deviations by a few percent down or up, which are caused in particular by the discretization of the partial mass flow increments which are possible and realizable. Thus the group mass flow of group II is therefore twice that of group I, that of group III is twice that of group II, and so forth. With four groups, the group mass flows therefore behave at least approximately like 1:2:4:8. With such a binary group graduation, 15 equidistantly graduated discrete liquid mass flows can be set with the operation of only 4 nozzle groups, that is to say with a preferably corresponding combination of nozzle tubes at one shut-off member in each case, with only 4 shut-off members, at essentially uniform atomizing quality. The group mass flow of the smallest group is in this case $1/15$ of the total nominal mass flow; in general, the relative group mass flow of the smallest group with N groups graduated in a binary fashion is determined from the formula $1/2^{N-1}$. At a setting of the liquid mass flows with 4 groups graduated in a binary fashion, the switching scheme shown below is used:

TABLE 1

| Groups to which liquid is admitted | Liquid mass flow in $1/15$ of the total nominal mass flow |
|---|---|
| I | 1 |
| II | 2 |
| II + I | 3 |
| III | 4 |
| III + I | 5 |
| III + II | 6 |
| III + II + I | 7 |
| IV | 8 |
| IV + I | 9 |
| IV + II | 10 |
| IV + II + I | 11 |
| IV + III | 12 |
| IV + III + I | 13 |
| IV + III + II | 14 |
| IV + III + II + I | 15 |

In the light of the above comments, application to a different number of groups graduated in a binary fashion will be readily apparent to the person skilled in the art. Furthermore, it can be seen from FIG. 2 that the tubes assigned to a group are selected in such a way that the distribution of the respective tubes to which liquid is admitted is in each case as homogeneous and as symmetrical as possible over the cross section of flow.

Figure 3:
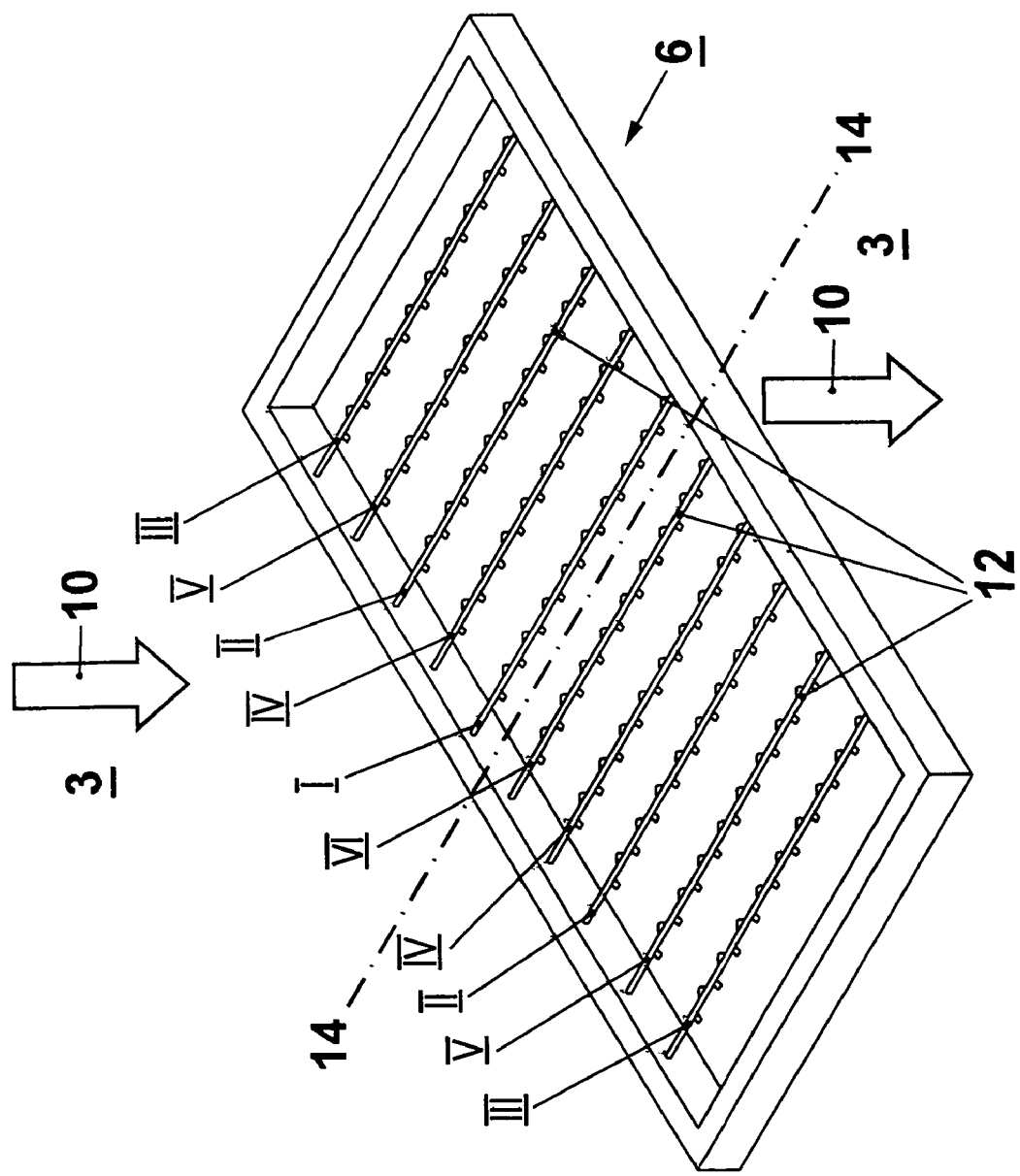
FIG. 3 shows a further example of an injection device for a rectangular inflow-duct cross section.

FIG. 3 shows a further example of the embodiment of the invention. The injection device 6 shown there has ten tubes 12 with atomizing nozzles (not shown). The following comments assume that all the tubes have the same number of identical atomizing nozzles. The nozzle tubes are combined to form six groups I to VI. In this case, the relative group mass flow of groups I and VI is 10% each, and is 20% each for groups II, III, IV and V. The grouping enables the injection mass flow to be set in 10% increments. The groups II, III, IV and V are arranged symmetrically to the center line 14, and the groups I and VI are arranged asymmetrically to the center line 14; that is today that, if liquid is admitted to either group I or group VI without liquid being admitted to the other of the two groups at the same time, asymmetry results. This is perfectly tolerable, since the asymmetry occurs at a small distance from the center line; it therefore has a slight "moment". A similar situation applies if only one tube is operated asymmetrically when liquid is admitted to a multiplicity of tubes; the asymmetry is then of only slight consequence. During the operation of the groups for covering the entire injection mass flow range, two switching schemes are suitable in principle:

TABLE 2

| Switching scheme 1: groups to which liquid is admitted | Switching scheme 2: groups to which liquid is admitted | Liquid mass flow in % of the total nominal mass flow |
|---|---|---|
| I | I | 10 |
| II | I + VI | 20 |
| II + I | II + I | 30 |
| III + II | II + I + VI | 40 |
| III + II + I | III + II + I | 50 |
| IV + III + II | III + II + I + VI | 60 |
| IV + III + II + I | IV + III + II + I | 70 |
| V + IV + III + II | IV + III + II + I + VI | 80 |
| V + IV + III + II + I | V + IV + III + II + I | 90 |
| V + IV + III + II + I + VI | V + IV + III + II + I + VI | 100 |

Whereas switching scheme 2 has less asymmetry, switching scheme 1 requires fewer switching operations.

Note again that the switching schemes described in no way need to be operated in a time sequence, but rather all the groups necessary according to a switching scheme for a desired mass flow are advantageously operated simultaneously.

Figure 4:
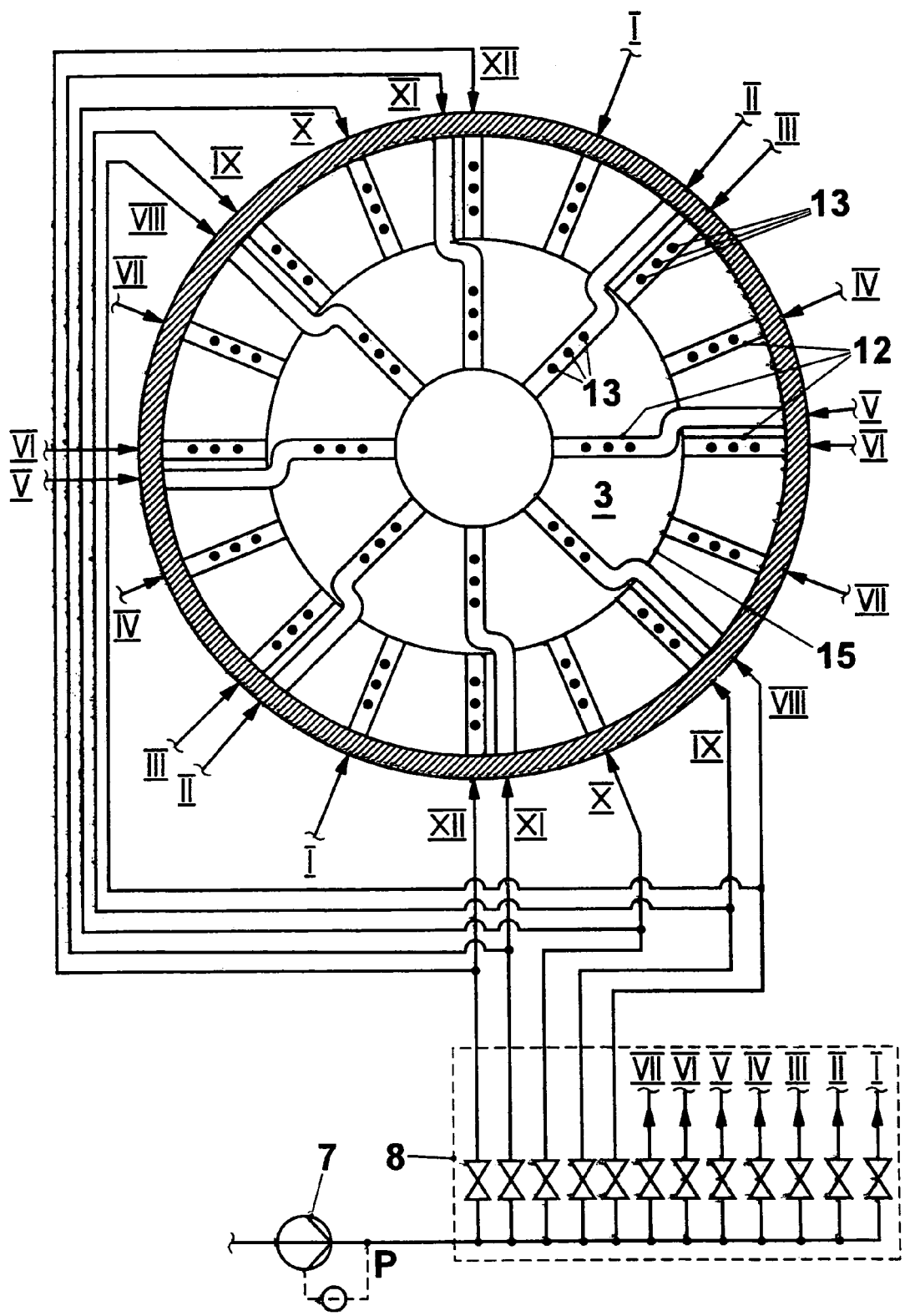
FIG. 4 shows an injection device for a circular-ring shaped inflow duct with radial orientation of nozzle tubes.
Figure 5:
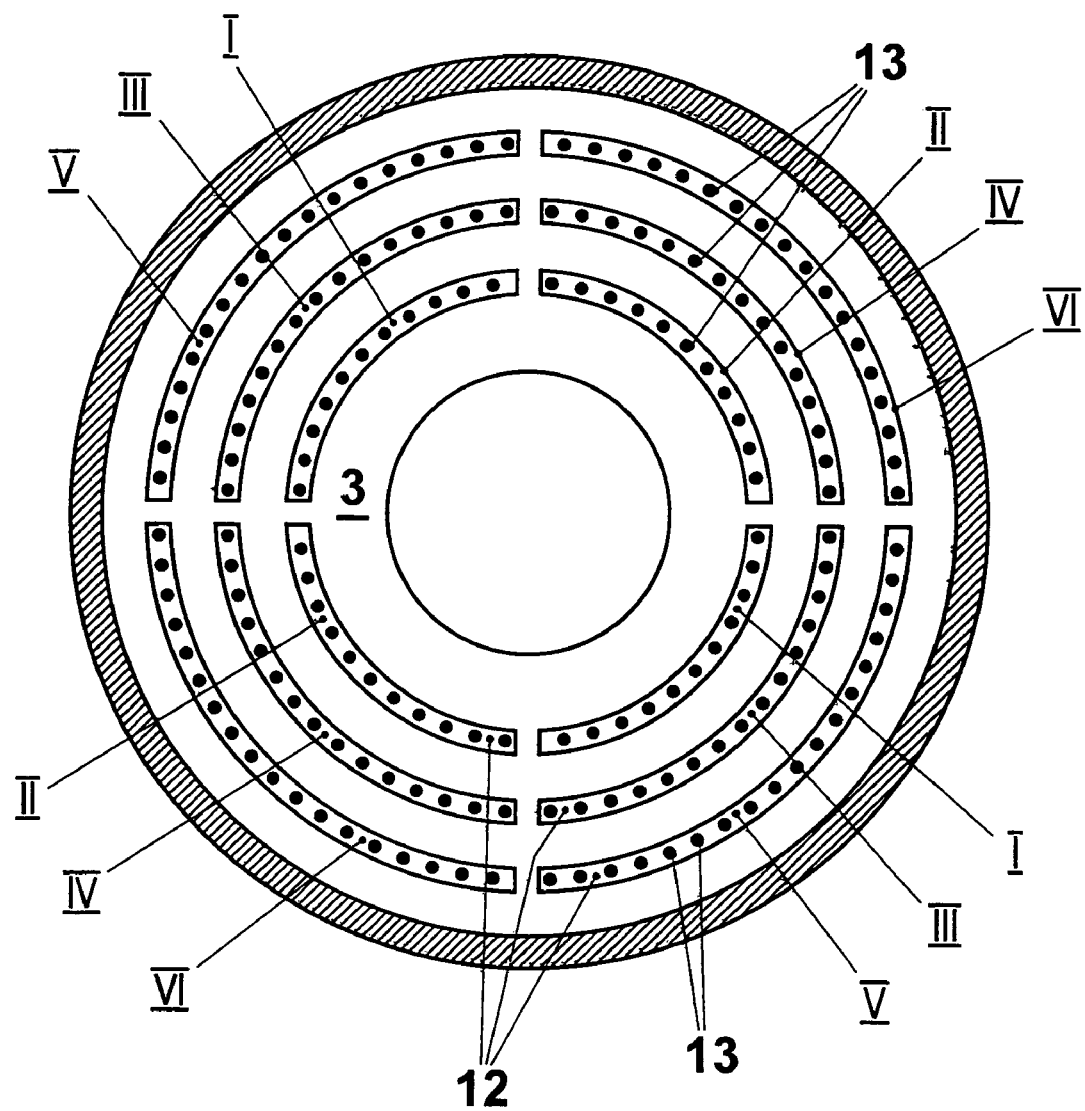
FIG. 5 shows an injection device for a circular-ring-shaped inflow duct with circumferential orientation of nozzle tubes.

FIG. 4 shows a further exemplary embodiment of an injection device which can be operated according to the method according to the invention. The device shown here is suitable in particular for use in circular or virtually circular or circular-ring-shaped cross sections of flow, thus in the direct inlet region of a compressor, in the "bellmouth". The—several—symmetry lines are not depicted here for the sake of clarity but will be readily apparent to the person skilled in the art. The atomizer nozzles 13 are arranged on nozzle tubes 12, some of the nozzle tubes carrying nozzles in a radially inner region of the circular-ring-shaped inflow duct 3, and others carrying nozzles in a radially outer region. The nozzles are arranged at an angular distance of 45° in the radially inner region and at an angular distance of 22.5° in the outer region in order to be able to achieve homogenous spraying. The tubes are supported relative to one another by a stiffening ring 15 in order to avoid chattering or vibrations. Liquid is admitted to the nozzle tubes via the pump 7, which is regulated to a constant pressure, and via the shut-off members arranged in the valve block 8. In each case two nozzle tubes opposite one another are combined to form a group, and liquid is admitted to them by a common shut-off member. A possible switching scheme which enables the gas flow to be loaded with droplets as far as possible in a homogeneous and symmetrical manner could be: XII-VI-II-VIII-V-XI-IX-III-X-IV-VII-I, although other switching schemes may also prove to be suitable.

In the injection device shown in FIG. 5, the nozzle tubes 12 are arranged in a ring-segment-shaped configuration in the circular-ring-shaped inflow duct 3. The radial spacing of the nozzle tubes 12 decreases toward the outside. In each case radially opposite tubes with atomizer nozzles are again combined to form a group I, II, III, IV, V, VI, and liquid is jointly admitted to them, as a result of which asymmetry is again avoided or minimized.

The embodiments explained in the exemplary embodiments do not of course constitute any restriction of the invention described in the claims; in particular, it is of course not imperative to operate the nozzles or tubes in groups. The equidistant arrangement, shown in FIGS. 2 and 3, of the nozzle tubes is also by no means imperative.

LIST OF DESIGNATIONS

1 Gas turboset
1*a* Compressor
1*b* Combustor
1*c* Turbine
2 Inflow region, intake section
3 Inflow duct
4 Air filter
5 Silencer
6 Injection device
7 liquid pump
8 Valve block
10 Gas flow
11 Frame
12 Tube, nozzle tube
13 Nozzle, injection nozzle, atomizer nozzle
14 Symmetry line, center line
15 Supporting ring
I Nozzle/tube group
II Nozzle/tube group
III Nozzle/tube group
IV Nozzle/tube group
V Nozzle/tube group
VI Nozzle/tube group
VII Nozzle/tube group
VIII Nozzle/tube group
IX Nozzle/tube group
X Nozzle/tube group
XI Nozzle/tube group
XII Nozzle/tube group

What is claimed is:

1. A method of controlling the injection of liquid into an inflow duct of a prime mover or driven machine, the method comprising:

providing an injection device for a total nominal mass flow, the injection device having a number of pressure atomizer nozzles that are arranged in a distributed manner substantially uniformly over a cross section of the inflow duct to provide sufficient pumping distance, each nozzle being configured for throughput of a partial mass flow of the total nominal mass flow, the injection device having at least one symmetry line defining two sides;

at a least three sequential injection mass flows which are below the total nominal mass flow, for each injection mass flow, admitting liquid to only some of the nozzles, wherein on each side of the symmetry line, liquid is admitted to the nozzles so that in sum the partial mass flows of the nozzles to which liquid is admitted is the same on each side of the symmetry line in order to avoid asymmetry of thermodynamic states that would be damaging to a compressor downstream of the injection device and would reduce the pumping distance;

wherein at least two nozzles are combined to form a nozzle group, liquid being jointly admitted to the nozzle group having an associated group throughput of liquid, and control being provided for selective admission of liquid to the nozzle group, such that flow of liquid to different nozzles of the injection device may simultaneously be controlled;

wherein at least two atomizer nozzles are arranged on at least one nozzle tube, with liquid being jointly admitted to the nozzles arranged on each of said at least one nozzle tube; and wherein nozzle tubes arranged essentially symmetrically to the symmetry line are combined to form a group to which liquid is to be jointly admitted.

2. The method of claim 1, wherein on each side of the symmetry line, liquid is admitted to nozzles arranged essentially in mirror image to one another.

3. The method of claim 1, wherein the nozzles are combined to form nozzle groups such that the same partial mass flow is passed through in each group as group throughput.

4. The method of claim 1, wherein the nozzles are associated with tubes that are combined to form groups such that the same partial mass flow is passed through in each group as group throughput.

5. The method of claim 1, wherein the nozzles are combined to form groups so that at least a first of the groups has a first group throughput and at least a second of the groups has a second group throughput which is smaller than the first group throughput.

6. The method of claim 5, wherein the second group throughput is 50% of the first group throughput.

7. The method of claim 1, wherein the nozzles are associated with tubes that are combined to form groups so that at least a first of the groups has a first group throughput and at least a second of the groups has a second group throughput which is smaller than the first group throughput.

8. The method of claim 7, wherein the second group throughput is 50% of the first group throughput.

9. The method of claim 1, wherein the nozzles are combined to form groups so that when liquid is admitted to the nozzles the group throughputs of the individual groups have a geometric graduation.

10. The method of claim 9, wherein the group throughput of a group is in each case twice the group throughput of the next smaller group so that the groups have a binary graduation of the group throughputs.

11. The method of claim 1, wherein the nozzles are associated with tubes that are combined to form groups so that when liquid is admitted to the nozzles the group throughputs of the individual groups have a geometric graduation.

12. The method of claim 11, wherein the group throughput of a group is in each case twice the group throughput of the next smaller group so that the groups have a binary graduation of the group throughputs.

13. The method of claim 1, wherein at least two tubes are combined to form a group, liquid being jointly admitted to the tube group having an associated group throughput of liquid.

14. The method of claim 13, wherein nozzles arranged essentially symmetrically to the symmetry axis are combined to form a group to which liquid is to be jointly admitted.

15. The method of claim 1, wherein pressure drop over the injection nozzles is kept constant.

16. The method of claim 1, wherein supply pressure of the liquid before flowing through the injection nozzles is kept constant.

17. The method of claim 1, wherein a plurality of the nozzle tubes are provided, the nozzle tubes being arranged in a cross section of the inflow duct with a shape selected from the group consisting of circular and circular-ring-shaped, wherein at least one of the nozzle tubes carries nozzles in a radially inner region of the cross section of the inflow duct, at least one of the nozzle tubes carries nozzles in a radially outer region of the cross section of the inflow duct, wherein in each case two opposing nozzle tubes form a nozzle group that permits droplet injection in a homogeneous and symmetrical manner.

18. An injection device for the injection of liquid into an inflow duct of a prime mover or driven machine designed for injecting a total nominal mass flow, the injection device comprising:
- a number of pressure atomizer nozzles that are arranged in a distributed manner substantially uniformly over a cross section of the inflow duct to avoid asymmetry of thermodynamic states and thereby provide sufficient pumping distance, each nozzle being configured for throughput of a partial mass flow of the total nominal mass flow;
- at least one symmetry line defining two sides;
- at least one nozzle tube on which at least two of the nozzles are arranged, with liquid being jointly admitted to the nozzles arranged on each of said at least one nozzle tube;
- at least one nozzle group, in which at least two of the nozzles are combined to form each group, with nozzles of each group being arranged on each side of the symmetry line, valves connected to each nozzle group and controlling flow such that at at least three sequential injection mass flows that are below the total nominal mass flow, for each injection mass flow, the valves admit liquid to only some of the nozzles, wherein on each side of the symmetry line liquid is admitted to the nozzles so that in sum the partial mass flows of the nozzles to which liquid is admitted together are the same in order to avoid asymmetry of thermodynamic states that would be damaging to a compressor downstream of the injection device and would reduce the pumping distance at an injection mass flow which is below the total nominal mass flow when liquid is only admitted to some of the nozzles, and control being provided for selective admission of liquid to the at least one nozzle group, such that flow of liquid to different nozzles of the injection device may simultaneously be controlled; and
- supply lines to which the nozzles are connected, all the supply lines of the nozzles of the at least one nozzle group being connected at a point situated upstream therefrom, said supply lines being activated via a common shut-off member.

19. The device of claim 18, wherein all the nozzles are identical.

20. The device of claim 18, wherein the nozzles are arranged equidistantly in the flow duct.

21. An injection device for the injection of liquid into an inflow duct of a prime mover or driven machine designed for injecting a total nominal mass flow, the injection device comprising:
- a number of pressure atomizer nozzles that are arranged in a distributed manner substantially uniformly over a cross section of the inflow duct to avoid asymmetry of thermodynamic states and thereby provide sufficient pumping distance, each nozzle being configured for throughput of a partial mass flow of the total nominal mass flow;
- at least one symmetry line defining two sides;
- at least one nozzle tube on which at least two of the nozzles are arranged, with liquid being jointly admitted to the nozzles arranged on each of said at least one nozzle tube;
- at least one nozzle group, in which at least two of the nozzles are combined to form each group, with nozzles of each group being arranged on each side of the symmetry line, valves connected to each nozzle group and controlling the flow such that at at least three sequential injection mass flows that are below the total nominal mass flow, for each injection mass flow, the valves admit liquid to only some of the nozzles, wherein on each side of the symmetry line liquid is admitted to the nozzles so that in sum the partial mass flows of the nozzles to which liquid is admitted together are the same on each side of the symmetry line in order to avoid asymmetry of thermodynamic states that would be damaging to a compressor downstream of the injection device and would reduce the pumping distance at an injection mass flow which is below the total nominal mass flow when liquid is only admitted to some of the nozzles, and control being provided for selective admission of liquid to the at least one nozzle group, such that flow of liquid to different nozzles of the injection device may simultaneously be controlled; and
- supply lines to which the tubes are connected, all the supply lines of the tubes associated with the at least one nozzle group being connected at a point situated upstream therefrom, said supply lines being activated via a common shut-off member.

22. The device of claim 21, wherein all the tubes are identical.

23. The device of claim 21, wherein the tubes are arranged equidistantly in the flow duct.

24. A method of controlling the injection of liquid into an inflow duct of a prime mover or driven machine, the method comprising:
- providing an injection device for a total nominal mass flow, the injection device having a number of pressure atomizer nozzles that are arranged in a distributed manner substantially uniformly over a cross section of the inflow duct to provide sufficient pumping distance, each nozzle being configured for throughput of a partial mass flow of the total nominal mass flow, the injection device having at least one symmetry line defining two sides;
- at an injection mass flow which is below the total nominal mass flow, admitting liquid to only some of the nozzles, wherein on each side of the symmetry line, liquid is admitted to the nozzles so that in sum the partial mass flows of the nozzles to which liquid is admitted is the same on each side of the symmetry line in order to avoid asymmetry of thermodynamic states that would be damaging to a compressor downstream of the injection device and would reduce the pumping distance;
- wherein at least two nozzles are combined to form a nozzle group, liquid being jointly admitted to the nozzle group having an associated group throughput of liquid;
- wherein at least two atomizer nozzles are arranged on at least one nozzle tube, with liquid being jointly admitted to the nozzles arranged on each of said at least one nozzle tube;

wherein nozzle tubes arranged essentially symmetrically to the symmetry line are combined to form a group to which liquid is to be jointly admitted; and wherein the nozzle tubes are arranged in a ring-segment-shaped configuration in a circular-ring-shaped inflow duct, the radial spacing of the nozzle tubes decreasing toward an outside thereof, wherein in each case radially opposite nozzle tubes with atomizer nozzles form a nozzle group to which liquid is admitted in a symmetrical manner.

* * * * *

UNITED STATES PATENT AND TRADEMARK OFFICE
CERTIFICATE OF CORRECTION

PATENT NO. : 7,520,137 B2  Page 1 of 1
APPLICATION NO. : 11/142328
DATED : April 21, 2009
INVENTOR(S) : Juergen Hoffmann et al.

It is certified that error appears in the above-identified patent and that said Letters Patent is hereby corrected as shown below:

In claim 1, Col. 9, line 64, replace "at a least" with --at at least--.

Signed and Sealed this

Twenty-sixth Day of May, 2009

JOHN DOLL
*Acting Director of the United States Patent and Trademark Office*